US006804405B2

(12) United States Patent
Christopoulos et al.

(10) Patent No.: US 6,804,405 B2
(45) Date of Patent: Oct. 12, 2004

(54) METHOD AND A SYSTEM FOR CODING ROIS

(75) Inventors: Charilaos Christopoulos, Sollentuna (SE); Joel Askelöf, Uppsala (SE); Mathias Larsson, Saltsjöbaden (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/827,313

(22) Filed: Apr. 6, 2001

(65) Prior Publication Data

US 2002/0126906 A1 Sep. 12, 2002

Related U.S. Application Data

(63) Continuation of application No. PCT/SE99/01785, filed on Oct. 6, 1999.

(30) Foreign Application Priority Data

Oct. 9, 1998  (SE) ............................................. 9803454

(51) Int. Cl.[7] ............................................. G06K 9/36
(52) U.S. Cl. ..................... 382/243; 382/240; 382/248
(58) Field of Search ................................ 382/239, 240, 382/243, 232, 244, 248, 251; 375/240.19, 240.02

(56) References Cited

U.S. PATENT DOCUMENTS

| | | | |
|---|---|---|---|
| 4,698,689 A | 10/1987 | Tzou .................... 358/426.14 |
| 4,903,317 A | 2/1990 | Nishihara et al. ........... 382/244 |
| 5,001,561 A | 3/1991 | Haskell .................. 375/240.02 |
| 5,196,933 A | 3/1993 | Henot .................... 375/240.05 |
| 5,333,212 A | 7/1994 | Ligtenberg ................. 382/250 |
| 5,339,108 A | 8/1994 | Coleman et al. ......... 375/240.2 |
| 5,363,138 A | 11/1994 | Hayashi et al. .......... 348/390.1 |
| 5,563,960 A | * 10/1996 | Shapiro ....................... 382/239 |
| 5,901,249 A | 5/1999 | Ito et al. ..................... 382/239 |

FOREIGN PATENT DOCUMENTS

WO  94/22108  9/1994  ............ G06K/9/36

OTHER PUBLICATIONS

"Lossy/lossless Region–of–Interest Image Coding Based on Set Partitioning in Hierarchical Tree," Proceedings of 1998 International Conference on Image processing, ICIP 98, vol. 1, Oct. 4–7 1998, pp. 87–91.*

"A new, Fast and Efficient Image Codec Based on Set Partitioning in Hierarchical Trees," Said et al., IEEE Transactions on Circuits and System for Video Technology, vol. 6, No. 3, Jun. 1996, pp. 243–250.*

(List continued on next page.)

Primary Examiner—Wenpeng Chen
(74) Attorney, Agent, or Firm—Nixon & Vanderhye P.C.

(57) ABSTRACT

In a method and a system for encoding and transmission of still images having at least one region of interest (ROI), the ROI coefficients of an image transformed into the frequency domain, preferably using a wavelet transform are encoded so that they are transmitted first and can be decoded by a receiver without transmission of the boundary of the ROI. In a preferred embodiment the coefficients belonging to the ROI are shifted so that the minimum ROI coefficient is larger than the largest background coefficient. A receiver can then perform an opposite procedure and thereby obtain the ROI. By specifying how much the coefficients need to be shifted in order to avoid sending shape information several advantages are achieved. Thus, it is possible to avoid sending shape information and to avoid shape encoding at encoder side. Furthermore, there is no need for a shape decoder at receiver side, and there is no need for the receiver to produce the ROI mask. Also, in another preferred embodiment, the shifting (or scaling operations) required at encoder and decoder are also avoided.

43 Claims, 4 Drawing Sheets

OTHER PUBLICATIONS

ISO/IEC JTC 1/SC 29/WG 1 N988, Oct. 5, 1998, C. Christopoulos, JPEG 2000 Verification Model Version 2.0/2.1.

Proceedings of the SPIE Conference on Visual Communications and Image Processing, vol. 2094 Part 2, 1993, A. Said et al., "Reversible image Compression via Multiresolution Representation and Predictive Coding", pp. 664–674.

Signal Processing, vol. 59, No. 2, Jun. 1997, J. Ström et al., "Medical Image Compression With Lossless Regions Of Interest", pp. 155–171.

International Search Report PCT/SE98/01809.

Vlahakis et al. "ROI Approach To Wavelet–Based, Hybrid Compression Of MR Images", Image Processing and Its Applications, 1997, Sixth International Conference, vol. 2, Jul. 14–17, 1997, pp. 833–837.

U.S. patent application Ser. No. 09/532,768 filed Mar. 22, 2000, Nister et al.

U.S. patent application Ser. No. 09/534,118 filed Mar. 23, 2000, Christopoulos et al.

Xiong et al., "A DCT–Based Embedded Image Coder" IEEE Signal Processing Letters, vol. 3, Issue 11, Nov. 96, pp. 289–290.

Nguyen–Phi et al. "DWT Image Compression Using Contextual Bitplane Coding of Wavelet Coefficients", Acoustics, Speech and Signal Processing, 1997, ICASSP–97, 1997 IEEE International Conference, vol. 4, Apr. 21–24, 1997, 2969–2972.

Laurance et al. "Embedded DCT Coding with Significance Masking" Acoustics, Speech, and Signal Processing, 1997, ICASSP 97, 1997 IEEE International Conference, vol. 4, Apr. 21–24, 1997, pp. 2717–2720.

Panagiotidis et al., "Region–of–Interest Based Compression of Magnetic Resonance Imaging Date", Proceedings/IWISP '96, Third International Workshop on Image and Signal Processing on the Theme of Advances in Computational Intelligence, Edited by Mertzios et al., Nov. 4–7, 1996, pp. 31–35.

Atsumi et al. "Lossy/Lossless Region–of–Interest Image Coding Based on Set Partitioning in Hierarchical Trees" ISO/IEC JTC 1/SC 29/WG 1N839, Mar. 23, 1998.

V. Heer et al., A Comparison of Reversible Methods for Data Compression, SPIE, vol. 1233 Medical Imaging IV: Image Processing, 1990, pp. 354–365.

\* cited by examiner

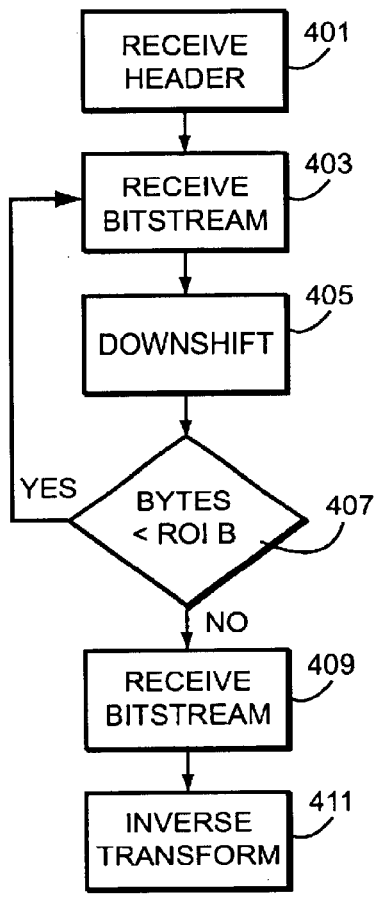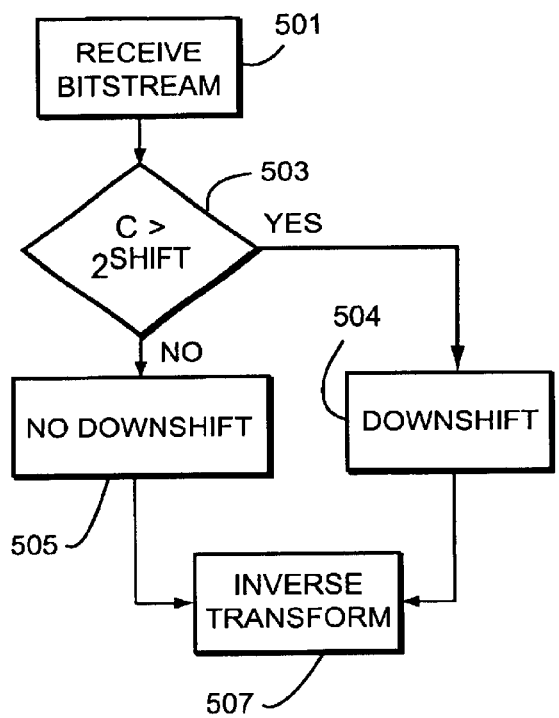
Fig. 4
Fig. 5

WHERE ROI_CM: SPECIFIES THAT THE PROPOSED ROI CODING
METHOD IS USED.

SV: SPECIFIES THE VALUE THAT THE ROI COEFFICIENTS
WERE SHIFTED UP.

NBYTES_ROI: SPECIFIES THE TOTAL NUMBER OF BYTES SPENT FOR
CODING THE ROI COEFFICIENTS.

WHERE SIGNAL = CODESTREAM THAT CAN'T BE EMULATED
FROM THE ARITHMETIC ENCODER.

METHOD AND A SYSTEM FOR CODING ROIS

This is a continuation of PCT application No. PCT/SE99/01785, filed Oct. 6, 1999, the entire content of which is hereby incorporated by reference in this application.

TECHNICAL FIELD

The present invention relates to a method and a system for coding of Region of interest (ROI) in still image coding schemes. The method and the system are particularly well suited for use in the JPEG 2000 standard and other wavelet based coders (as in MPEG 4) for still image compression.

BACKGROUND OF THE INVENTION AND PRIOR ART

In the JPEG 2000 standard there is support for the encoding of various parts of the image at various bitrates. A region encoded at a higher bit rate than the other parts of the image is considered a Region of Interest (ROI). Encoding of images with Regions of Interest has been a key issue in recent years. The JPEG 2000 standard under development has addressed the issue of efficient encoding of ROI's, see Charilaos Christopoulos (editor), ISO/IEC JTC1/SC29/WG1 N988 JPEG 2000 Verification Model Version 2.0/2.1., Oct. 5, 1998. One of the modes for ROI coding in the JPEG 2000 verification model (VM) is called "scaling based method". In this method, the ROI coefficients are scaled up (basically shifted up), so that they are coded first during the encoding process. This gives the ability to see the important parts of the image at earlier stages of the transmission. The method increases slightly the bitrate for lossless coding of the image compared to not shifting the coefficients at all, but gives the ability of fast viewing of the important elements of the image, i.e. the ROI's.

In JPEG 2000 the transformed images are encoded bit-plane wise. This means that the information about high transform coefficients will be placed earlier in the bit stream than the rest of the information. The current "scaling based coding method" for ROI coding is based on this fact. The coefficients corresponding to the ROI are upshifted prior to arithmetically encoding them. This means that information for these coefficients will be transmitted earlier in the bitstream than it would have without the shifting. At the early stages of the transmission, the ROI will be reconstructed with better quality than the background (BG). The whole operation is progressive by resolution or by quality.

Furthermore, E. Atsumi and N. Farvardin, "Lossy/lossless region-of-interest coding based on set partitioning in hierarchical trees", Proceedings of IEEE International Conference on Image Processing (ICIP-98), Chicago, Ill., USA, Oct. 4–7, 1998 describes the general idea of the scaling based coding method. In addition, encoding of ROI's is disclosed in U.S. Pat. No. 5,563,960, Oct. 8, 1996, although the ROI coding method described only performs scaling of the image data and not of the coefficients.

Using the methods as described above when encoding an image at various bitrates, information about what parts of the image should be encoded at what bit rate need be available to the encoder. Whereas the ROI might easily be described in the spatial domain, it will be more complicated in the transform domain. So far the information about the ROI shape must be available to the encoder and the decoder, thus it requires extra bits in addition to the bits representing the texture information. Moreover, a shape encoder is required (at the transmitter) and a shape decoder (at the receiver), making the whole system more complex and expensive to implement. The decoder has also to produce the ROI mask, i.e. it has to define which are the coefficients needed for the reconstruction of the ROI, see Charilaos Christopoulos (editor), ISO/IEC JTC1/SC29/WG1 N988 JPEG 2000 Verification Model Version 2.0/2.1., Oct. 5, 1998, and this adds to the computational complexity and memory requirements of the receiver, which should be as simple as possible.

The currently used method to solve these problems is to include the description of the ROI in the spatial domain, in the bitstream. The necessary mask of ROI coefficients (ROI mask) for the transform domain is then created in both the encoder and the decoder, see for example Charilaos Christopoulos (editor), ISO/IEC JTC1/SC29/WG1 N988 JPEG 2000 Verification Model Version 2.0/2.1., Oct. 5, 1998. The encoder encodes the shape information, and the encoded bitstream with the shape information is added to the total bitstream and transmitted to the receiver. The receiver, from the shape information decodes the shape, makes the ROI mask, and then decodes the texture information of the image.

In the case where the ROI shape is simple, (for example rectangle or circle), the shape information is not requiring many bits. However, even in these simple cases, the receiver has to produce the ROI mask, which means that the receiver requires memory as large as the whole image (but of 1 bit/pixel) and has a certain computational complexity (since the creation of the mask is similar to doing a wavelet transform). For a complex ROI, this means that a lot of information need be transmitted between encoder and decoder and computational complexity becomes an issue. The additional overhead for shape information is significant, particularly for low bitrates.

Also, the co-pending Swedish Patent Applications 9703690-9 and 9800088-8, corresponding to co-pending U.S. application Ser. No. 09/532,768, filed on Mar. 22, 2000, describe a method in which both encoder and decoder need to use and to define the ROI mask, i.e. to find which coefficients belong to the ROI or are needed for the ROI.

SUMMARY

It is an object of the present invention to provide a method and a system whereby no shape information needs to be transmitted in an ROI coding scheme.

This object is obtained by a method and a system wherein the ROI coefficients are encoded so that they are transmitted first and can be decoded by a receiver without transmission of the boundary of the ROI.

In a preferred embodiment the coefficients belonging to the ROI are shifted so that the minimum ROI coefficient is larger than the largest background coefficient. A receiver can then perform an opposite procedure and thereby obtain the ROI.

By specifying how much the coefficients needs to be shifted in order to avoid sending shape information several advantages are achieved. Thus, it is possible to avoid sending shape information and to avoid shape encoding at encoder side. Furthermore, there is no need for a shape decoder at receiver side, and there is no need for the receiver to produce the ROI mask.

Also, in another preferred embodiment the shifting (or scaling operations) required at encoder and decoder are also avoided.

BRIEF DESCRIPTION OF THE DRAWINGS

The present invention will now be described in more detail and with reference to the accompanying drawings, in which:

FIG. 4 is a flow chart illustrating the steps carried out at a decoder according to the first and second embodiment.

FIG. 5 is a flow chart illustrating the steps carried out at a decoder according to the third embodiment.

DETAILED DESCRIPTION

Figure 1:
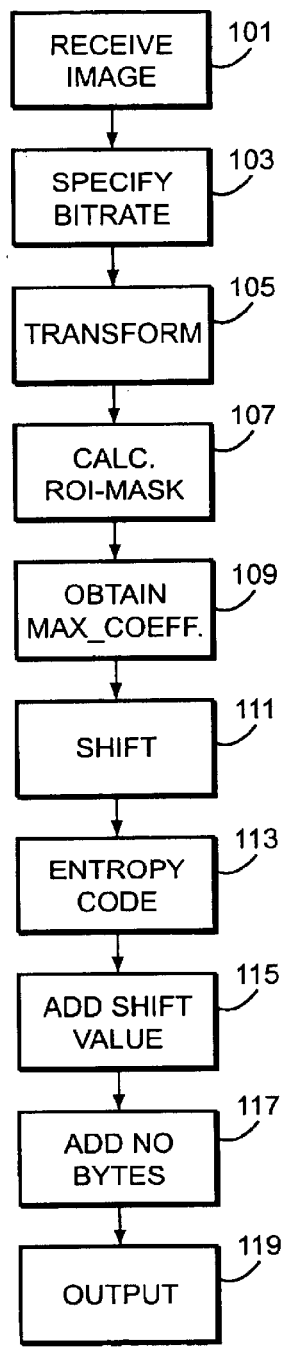
FIG. 1 is a flow chart illustrating the steps carried out at an encoder according to a first embodiment.

In FIG. 1, a flow chart illustrating the steps carried out at an encoder according to a first embodiment is shown. Thus, first in a step 101 an input image is received and its Region of Interest (ROI) is specified. Next, in step 103, the required bitrate or quality for the ROI and the Background (BG) is received. Thereupon, the image is transformed into wavelet domain, step 105. Next an ROI mask is calculated for example using the method described in Charilaos Christopoulos (editor), ISO/IEC JTC1/SC29/WG1 N988 JPEG 2000 Verification Model Version 2.0/2.1., Oct. 5, 1998, step 107.

Thereupon, the maximum wavelet coefficient(s) (MAX_Coeff) in the BG or the whole image are obtained, step 109. All coefficients in the ROI mask are then shifted so much that the minimum coefficient in the ROI mask is larger than the MAX_coeff, step 111. The image is then entropy coded until the ROI quality or bitrate and BG quality or bitrate specified in step 103 is achieved, step 113.

Next, the shifting value is added in the bitstream so that the decoder can find and read it, step 115. This is required for the decoder, since the decoder needs to know how much will the coefficients be down-shifted. Next, the number of bytes which were needed for encoding the coefficients in the ROI mask are added, step 117. The result in step 117 is used as output from the encoder, step 119.

If the shifting value is selected so that the minimum coefficients in the ROI mask is larger than the maximum coefficient in the BG, then during encoding only ROI coefficients will be coded, until the BG coefficients become significant. At that stage, all ROI coefficients have been coded and have to downshifted at the receiver, while the remaining coefficients correspond to the BG and need not to be downshifted. The receiver needs to know the number of bytes (or bits) which correspond to full coding of the ROI coefficients (i.e. at the point where the first BG coefficients starts to be coded). This information is put in the bitstream header and extracted from the receiver.

As an example, assume that the ROI coefficients are shifted left 8 times (i.e. multiply each ROI coefficient by $2^8$) and that all ROI coefficients then become larger than the largest BG coefficient. Then encoding starts and when all ROI coefficients are coded, the shifting value and the number of bytes needed for the ROI coefficients (Nbytes_ROI) are put in the bitstream header. The encoding continues as usual. The decoder gets the bitstream and starts decoding. When the decoder decodes a certain number of bytes which are less that the Nbytes_ROI, it shifts each coefficient down.

It should be noted that there are BG coefficients reconstructed which are zero since they were not coded at this stage and they will be shifted down since the decoder doesn't know anything about this. Up to when the number of bytes received is equal to Nbytes_ROI, then all coefficients are shifted down at the receiver. After this stage, no coefficients are shifted down. Notice here that the ROI coefficients are no longer updated since they are zero coded.

Using this method, the decoder doesn't need any shape information. The decoder doesn't need to know which coefficients correspond to an ROI, since it will be shifting down all coefficients, i.e. BG coefficients will be zero till all ROI coefficients are coded. The decoder doesn't need to produce any ROI mask, making the coding scheme even simpler. The only thing that the decoder need to do is the downshifting of the received ROI coefficients.

Figure 2:
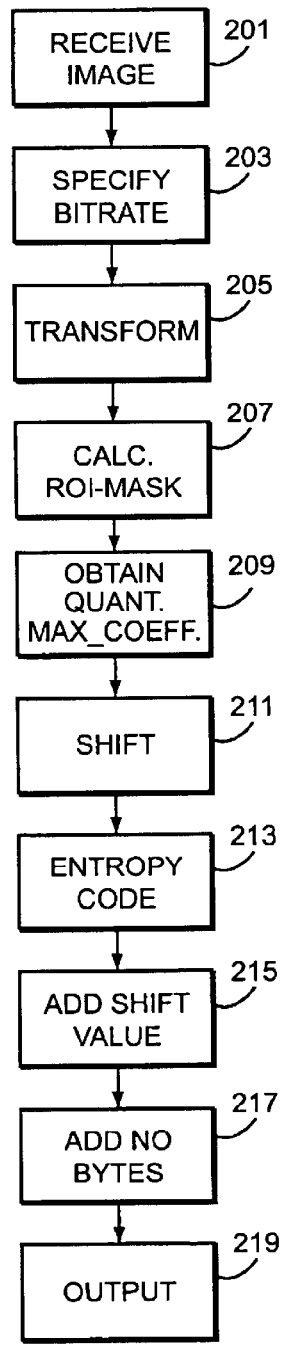
FIG. 2 is a flow chart illustrating the steps carried out at an encoder according to a second embodiment.

In FIG. 2, a flow chart illustrating the steps carried out in a second embodiment of an encoder is shown. The flow chart in FIG. 2 is identical to the flow chart in FIG. 1 except for that the maximum quantized coefficients are obtained and shifted in the steps 109 and 111 as is shown in the steps 209 and 211.

Using the method and encoder according to the second embodiment, less memory is needed for storing the shifted coefficients, because the quantized coefficients are smaller than the initial coefficients.

Figure 3:
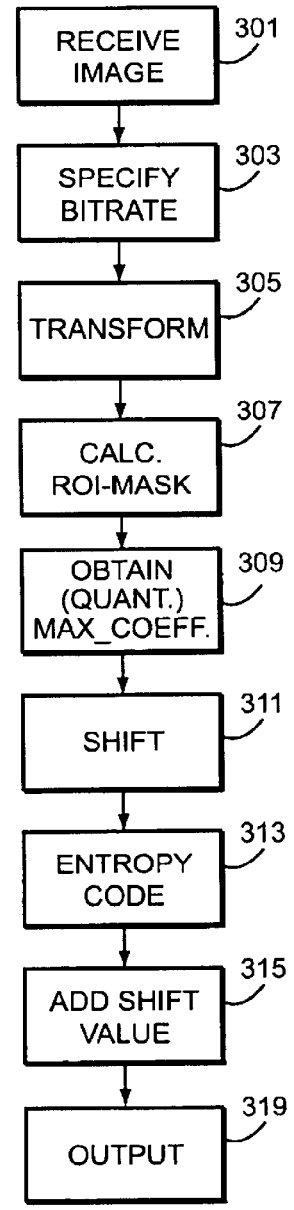
FIG. 3 is a flow chart illustrating the steps carried out at an encoder according to a third embodiment.

In FIG. 3, a flow chart illustrating the steps carried out in a third embodiment of an encoder is shown. The flow chart in FIG. 3 differs from the flow charts in FIG. 1 and FIG. 2 in that the number of bytes which were needed for encoding the coefficients in the ROI mask is not stored in the bitstream. Therefore, the flow chart in FIG. 3 does not comprise a step 317 corresponding to the steps 117 and 217. Even if it is stored it is not used at the decoder. Therefore, the third embodiment is similar to the first and second embodiment, but requires less information to be stored in the bitstream.

Below the decoder operations corresponding to the different encoding schemes described above in conjunction with FIGS. 1–3 are described. Thus, in FIG. 4 a flow chart illustrating the steps carried out at a decoder according to the first and second embodiment is shown.

First, in a step 401 a the header of the bitstream encoded according to the algorithm described above in conjunction with FIGS. 1 and 2 is received. The information about the shifting value used and the number of bytes (ROI_bytes) corresponding to the ROI coefficients (i.e. those that were shifted) is obtained. Next, in a step 403, the rest of the bitstream is received. If number of bytes received is less than ROI_bytes, after an entropy decoding of coefficients, they are down-shifted by the shifting value, step 405. It should be noticed that BG coefficients up to this stage were coded to zero, so down-shifting does not affect them. Intermediate reconstructed images can be obtained by inverse wavelet transform.

Next, in a step 407 it is evaluated if the number of bytes received is less than ROI_bytes, if yes then return to step 403. Else proceed to step 409. In step 409 the rest of the bitstream is received. This corresponds now to BG data and therefore from that stage on no coefficient will be downshifted. Finally, in step 411, an inverse wavelet transform gives the reconstructed image.

It should be noticed that the number of bytes is not really needed to be known to the decoder. This is because the decoder can scale down all coefficients that are above where shift_value is the shifting value used.

In FIG. 5, a flow chart illustrating the steps carried out in a decoder arranged to decode a bitstream encoded according to the third embodiment described above in conjunction with FIG. 3 is shown.

Thus, first in a step 501, the encoded bitstream is received. Information about the shifting value used is obtained. Next, in step 503 it is evaluated is the received coefficient is larger than $2^{(shift\ value)}$, if so then the coefficient is down shifted by the shift value in a step 504, else the process proceeds to step 505. In step 505 it is decided to not downshift the coefficient. Finally, in step 507, an inverse wavelet transform of the output values from the steps 504 and 505 gives the reconstructed image.

It should be noticed that some problems may appear in floating point wavelets where some coefficients might be between 0 and 1 and therefore they will never become larger than $2^{(shift\ value)}$ after shifting at the encoder. This means that they will never be downshifted at the decoder. To avoid such a problem the encoder according to the second embodiment could be used, where the quantized coefficients are shifted, since the quantized coefficients are integers.

The methods described above requires that the encoder shifts the coefficients up, i.e. multiplies them with a certain factor. Although the computational complexity of such operation is small, an alternative way to avoid transmitting the shape information and minimising the computational complexity of the decoder, which also avoids the down shifting operation at the decoder is sometimes advantageous.

Figure 6:
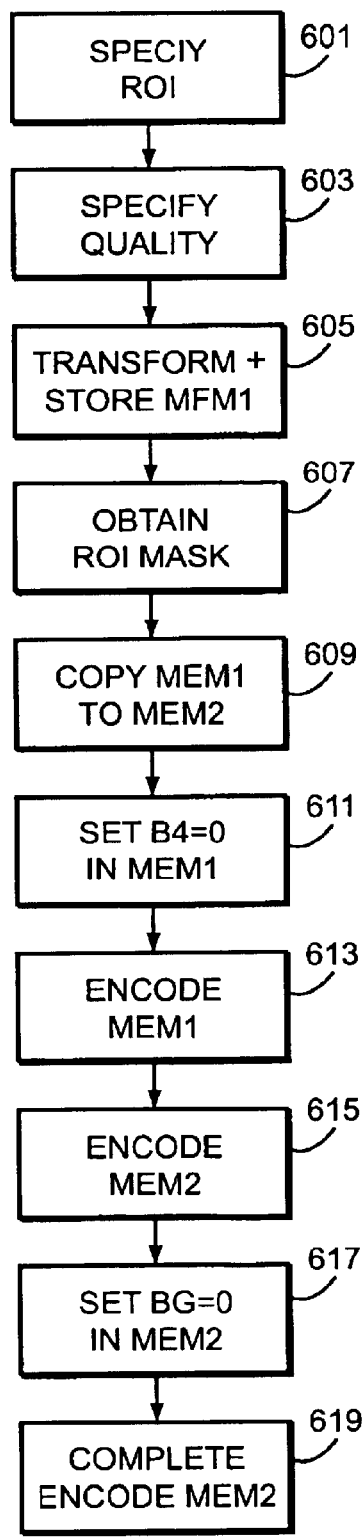
FIG. 6 is a flow chart illustrating the steps carried out at an encoder according to a fourth embodiment.

In FIG. 6, a flow chart illustrating the steps carried out in an encoder providing an encoded bit stream which does not need to be down shifted is shown.

Thus, first in a step 601, an input image to be encoded is received and its ROI is specified. The required bitrate or quality for ROI and BG is the received, step 603. Next, the image is transformed into the wavelet domain and store to a first memory (MEM1), step 605.

Thereupon, an ROI mask is generated as describe above, step 607. The content of the first memory (MEM1) is then copied to a second memory (MEM2), step 609. The step 609 is only required if the BG information is to be used in later stages. Then all coefficients of MEM1 outside the ROI mask are set to zero, step 611. The wavelet coefficients in MEM1 are then encoded using JPEG 2000 encoding methods, step 613.

It should be noticed that encoding is performed for all coefficients. However, since BG coefficients are zero, only ROI coefficients are actually coded (BG coefficients corresponding to zero are also coded but they don't occupy much bitrate).

Encoding of MEM1 is performed until the required bitrate (ROI rate of ROI quality), then the encoder will switch and start encoding from the coefficients in MEM2, step 615. All coefficients in the ROI mask are then set to zero in MEM2, step 617. This means that BG coefficients will be coded.

Finally, in step 619 encoding the MEM2 (where coefficients in ROI mask are set to zero) is done until the bitrate or quality specified for the BG is achieved.

Figure 7:
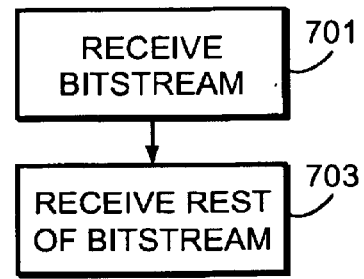
FIG. 7 is a flow chart illustrating the steps carried out at a decoder according to the fourth embodiment.

In FIG. 7, a flow chart illustrating the steps carried out in a decoder arranged to decode a bitstream encoded according to the embodiment described above in conjunction with FIG. 6 is shown.

Thus, first in a step 701, a bitstream encoded according to the algorithm described above in conjunction with FIG. 6 is received until the number of bytes for MEM1 is obtained. Entropy decoding is performed and the MEM1 coefficients are obtained. It should be noticed that it is possible to perform an inverse wavelet transform to produce intermediate reconstructed image if this is required or desired.

Next, in a step 703, the rest of the bitstream is received until the total number of bytes is received. Entropy decoding is performed and the MEM2 coefficients are obtained. The MEM2 coefficient are added to the MEM1 coefficients. An inverse wavelet transform of the added coefficients produces the reconstructed image with both ROI and BG.

It should be noticed that when bits corresponding to MEM2 coefficients are received, the receiver can do inverse wavelet transform to reconstruct only the image corresponding to MEM2 (i.e. has only the BG). Then it can add the reconstructed images of MEM1 and MEM2 together instead of adding the coefficients as described above in the steps 403 and 503.

The bitstream sent from the encoder has to have information on how many bytes (or bits) where coded for MEM1 image (where the BG where set to zero). This is because the receiver has to know when it starts receiving MEM2 (where the coefficients in ROI mask are set to zero). The receiver in this case adds the reconstructed MEM2 coefficients to the reconstructed MEM1 coefficients.

This method avoids completely shifting of coefficients at the encoder and decoder, avoids transmission of shape information, avoids the use of shape encoder and shape decoder and avoids the generation of the ROI mask at the decoder. The decoder must only know when it stops receiving MEM1 coefficients and starts receiving MEM2 coefficients, so it can add the coefficients together.

For real time encoding and transmission (encode and send simultaneously), the receiver might not know the total number of bytes spend for ROI coding. In this case the transmitter has to send a signal at the stage where the ROI coding has finished informing the receiver during the transmission that ROI coefficients were coded and after this stage he should not downshift any coefficient. This can be done by sending a codestream that can't be emulated from the arithmetic encoder.

It should be noticed that when the encoder according to the third embodiment is used, then no problem appears in real time applications. This is because the number of bytes for ROI coefficients is not really needed. What is needed is the shifting value, which is always included in the bitstream. Since the decoder down-shifts the coefficients that are above, it doesn't need any signal at all. Therefore, encoder according to the third embodiment has advantages compared to the other schemes.

It should also be noticed that although the methods described above consider the existence of one ROI, in practice there could be more than one. The methods apply in similar manner. In such cases one could consider that for a first ROI (ROI 1) all coefficients are shifted with the method described in previous section. Then for a second ROI (ROI 2) all coefficients are shifted in a similar manner but in such a way so that they are larger than the shifted coefficients of ROI 1. Then the procedure continues in a similar manner. The decoder can find which coefficients belong to a ROI 1 and which to ROI 2 by having the information about the shifting value for each ROI.

It is also to be noticed that for rectangular shapes, the mask generation in the decoder can be avoided if at each subband information, of the ROI shape is transmitted. Rectangular ROI's have the property of producing rectangular ROI shapes in each subband and therefore the information of the ROI shape can be sent for each subband (for example upper left and lower right corner). This avoids the generation of the ROI mask in the decoder, however, it applies only for rectangular ROI shapes. The methods presented above are valid for any shape.

If the encoding is performed in the manner as described above, no information about the ROI need be transmitted except the value by which the coefficients have been upshifted and the number of bits of the bitstream that contain information that has been upshifted.

This means:

No information about the shape of the ROI need be transmitted. This saves a lot of bits in the bitstream especially for complex shapes.

There is no need to generate the mask for the ROI coefficients in the decoder. This save memory and computational complexity of the decoder Shape encoding is not required Shape decoding is not required Approximate extraction of the ROI shape information is possible from the bitstream.

Because the ROI mask expands in the higher subbands, it will start covering some of the BG or even all at the higher subbands (for example the LL subband). This means that BG information will be coded together with ROI information. Therefore, during decoding the receiver at the early stages of the transmission will recover most of the image (especially when progression by resolution is implemented). This avoids the problem of having a black BG reconstructed at the early stages.

Figure 8:
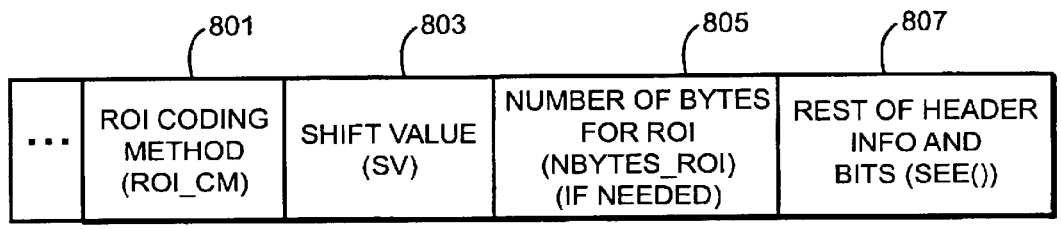
FIG. 8 is an illustration of a bitstream syntax used.

In FIG. 8, a possible bitstream syntax is given. It should be noticed that this can be part of the total business syntax which includes information on image type, etc. If encoding is done first and transmission after, the bitstream syntax should contain the following information:

ROI coding method (ROI_CM), transmitted in a first field 801

Shift value (SV), transmitted in a second field 803

Number of Bytes for ROI (NBYtes_ROI) (if needed), transmitted in a third field 805

Rest of header info and bits (see Charilaos Christopoulos (editor), ISO/IEC JTC1/SC29/WG1 N988 JPEG 2000 Verification Model Version 2.0/2.1., Oct. 5, 1998, transmitted in a fourth field 807

Where,

ROI_CM: specifies that the proposed ROI coding method is used

SV: specified the value that the ROI coefficients were shifter up

Nbytes_ROI: specifies the total number of bytes spend for coding the ROI coefficients (not needed for all encoding schemes specified above).

Figure 9:
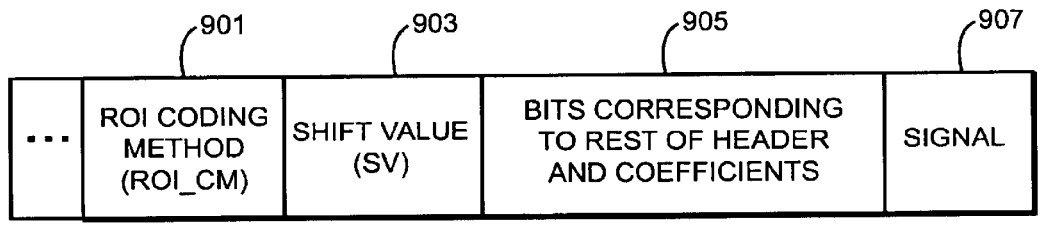
FIG. 9 is an illustration of an alternative bitstream syntax.

If the real time case is considered, i.e. encoding and transmission is performed simultaneously), the bitstream could be modified to the syntax shown in FIG. 9.

ROI coding method (ROI_CM), transmitted in a first field 901

Shift value (SV), transmitted in a second field 903

Bits corresponding to rest of header and coefficients, transmitted in a third field 905

Signal, transmitted in a fourth field 907

Where,

Signal=codestream that can't be emulated from the arithmetic encoder (not needed for all encoding schemes specified above).

What is claimed is:

1. A method of encoding an image, comprising:
specifying at least one Region of Interest (ROI);
transforming the image using a wavelet transform;
generating an ROI mask;
determining the maximum wavelet coefficient in the image;
shifting all the coefficients in the ROI mask so that the smallest ROI coefficient becomes larger than the largest coefficient of the rest of the image,
wherein only the coefficients outside the ROI are searched when determining the maximum wavelet coefficient.

2. A method according to claim 1, further comprising:
determining the number of bits to use for the encoded image, and encoding the image until the determined number of bits is obtained.

3. A method according to claim 2, wherein the image is encoded using an entropy code.

4. A method according to claim 1, further comprising:
quantizing the wavelet transformation coefficients prior to determining the maximum wavelet coefficient.

5. An encoder arranged to encode a still image according to claim 1.

6. A decoder arranged to decode a still image encoded according to claim 1.

7. A method of transmitting an image from a transmitter to receiver encoded according to the following:
specifying at least one Region of Interest (ROI);
transforming the image using a wavelet transform;
generating an ROI mask;
determining the maximum wavelet coefficient in the image;
shifting all the coefficients in the ROI mask so that the smallest ROI coefficient becomes larger than the largest coefficient of the rest of the image,
wherein the value used to shift the wavelet coefficients is added in the transmitted bitstream,
wherein the number of bytes used for encoding the coefficients in the ROI mask is added in the transmitted bitstream.

8. A method of encoding an image, comprising:
specifying a Region of Interest (ROI);
transforming the image using a wavelet transform to produce image coefficients;
generating an ROI mask; and
determining a number of bit planes sufficient to encode coefficients outside of the ROI mask.

9. The method according to claim 8, wherein the coefficients outside of the ROI mask are encoded bit plane wise.

10. A method according to claim 8, wherein ROI coefficients are encoded in higher bit planes than the coefficients outside of the ROI mask, and wherein bits of the coefficients outside of the ROI mask are zero in the higher bit planes.

11. A method according to claim 8, wherein the ROI coefficients are placed in higher bit planes than the ROI coefficients outside of the ROI mask by bit shifting the ROI coefficients so that a smallest non-zero ROI coefficient is larger than a largest one of the coefficients outside of the ROI mask.

12. A method according to claim 11, further comprising:
quantizing the coefficients prior to bit shifting the coefficients.

13. A method according to claim 8, wherein the image is encoded using entropy coding.

14. A method of transmitting an image encoded according to claim 8 from a transmitter to a receiver, wherein a value used to shift the coefficients is included in a transmitted bit stream.

15. A method according to claim 8, wherein a number of bytes used for encoding the coefficients in the ROI mask is included in a transmitted bit stream.

16. A method according to claim 8, wherein a bit indicating a number of bytes used for encoding the coefficients in the ROI mask is included in a transmitted bit stream.

17. An encoder arranged to encode an image comprising:
means for specifying a Region of Interest (ROI);
means for transforming the image using a wavelet transform to produce image coefficients;
means for generating an ROI mask; and means for determining a number of bit planes sufficient to encode the coefficients outside of the ROI mask.

18. The encoder according to claim 17, further comprising:
means for encoding coefficients outside of the ROI mask bit plane wise.

19. The encoder according to claim 17, further comprising:
means for encoding ROI coefficients in higher bit planes than coefficients outside of the ROI mask, and wherein bits of the coefficients outside of the ROI mask are zero.

20. The encoder according to claim 17, further comprising:
means for placing ROI coefficients are placed in higher bit planes than ROI coefficients outside of the ROI mask by bit shifting the ROI coefficients so that a smallest non-zero ROI coefficient is larger than a largest one of the coefficients outside of the ROI mask.

21. The encoder according to claim 20, further comprising:
means for quantizing the coefficients prior to bit shifting the coefficients.

22. The encoder according to claim 17, further comprising:
means for encoding the image using entropy coding.

23. An encoder arranged to encode an image comprising electronic circuitry configured to perform the following operations:
specify a Region of Interest (ROI);
transform the image using a wavelet transform to produce image coefficients;
generate an ROI mask; and
determine a number of bit planes sufficient to encode the coefficients outside of the ROI mask.

24. The encoder according to claim 23, further comprising:
an encoder configured to encode coefficients outside of the ROI mask bit plane wise.

25. The encoder according to claim 23, further comprising:
an encoder configured to encode ROI coefficients in higher bit planes than coefficients outside of the ROI mask, and wherein bits of the coefficients outside of the ROI mask are zero in the higher bit planes.

26. The encoder according to claim 23, wherein the electronic circuitry is further configured to place ROI coefficients in higher bit planes than ROI coefficients outside of the ROI mask by bit shifting the ROI coefficients so that a smallest non-zero ROI coefficient is larger than a largest one of the coefficients outside of the ROI mask.

27. The encoder according to claim 23, further comprising:
a quantizer configured to quantize the coefficients prior to bit shifting the coefficients.

28. A method of decoding an image having a Region of Interest (ROI), comprising:
receiving a bit stream including coefficients associated with the image;
determining a shifting value from the received bit stream;
using the shifting value to determine a largest value of coefficients corresponding to a background portion of the image other than the ROI;
placing coefficients larger than the largest value in one or more bit planes; and
bit shifting the coefficients in the one or more bit planes down by the shifting value.

29. A method according to claim 28, wherein the bit stream is decoded into transformed coefficients using entropy decoding.

30. A method accordingly to claim 28, further comprising:
de-quantizing the coefficients prior to the inverse wavelet transform.

31. A method according to claim 28, wherein the placing of coefficients larger than the largest value is performed by decoding the one or more bit planes directly into bit planes having the bit-shifted coefficients, and wherein any remaining bit planes are decoded and added to the one or more bit planes.

32. A method in claim 28, wherein a number of bytes used for encoding the ROI coefficients is received in the bit stream and indicates when all of the ROI coefficients have been received.

33. A method in claim 28, wherein a bit indicating a number of bytes used for encoding the ROI coefficients is received in the bit stream.

34. A method in claim 28, further comprising:
halting the bit shifting when a number of bytes needed for encoding the ROI coefficients has been received.

35. A method in claim 28, further comprising:
transforming the coefficients into an image using an inverse wavelet transform.

36. Apparatus for decoding an image having a Region of Interest (ROI), comprising:
a receiver for receiving a bit stream including coefficients associated with the image, and
electronic circuitry configured to perform the following tasks:
determine a shifting value from the received bit stream;
use the shifting value to determine a largest value of coefficients corresponding to a background portion of the image other than the ROI;
place coefficients larger than the largest value in one or more bit planes; and
bit shift the coefficients in the one or more bit planes down by the shifting value.

37. Apparatus according to claim 36, wherein the electronic circuitry is configured to decode the bit stream into transformed coefficients using entropy decoding.

38. Apparatus accordingly to claim 36, further comprising:
means for de-quantizing the coefficients prior to the inverse wavelet transform.

39. Apparatus according to claim 36, wherein the electronic circuitry is configured to decode the one or more bit planes directly into bit planes having the bit-shifted coefficients and any remaining bit planes and then add the one or more bit planes.

40. Apparatus in claim 36, wherein a number of bytes used for encoding the ROI coefficients is received in the bit stream and indicates when all of the ROI coefficients have been received.

41. Apparatus in claim 36, wherein a bit indicating a number of bytes used for encoding the ROI coefficients is received in the bit stream.

42. Apparatus in claim 36, wherein the electronic circuitry is configured to halt bit shifting when a number of bytes needed for encoding the ROI coefficients has been received.

43. Apparatus according to claim 36, wherein the electronic circuitry is configured to transform the coefficients into an image using an inverse wavelet transform.

* * * * *